March 11, 1930.  H. WEINACKER  1,750,142
LINK WELDING MACHINE
Filed Aug. 6, 1927   3 Sheets-Sheet 1

INVENTOR.
Hermann Weinacker.
BY Barlow & Barlow
ATTORNEYS.

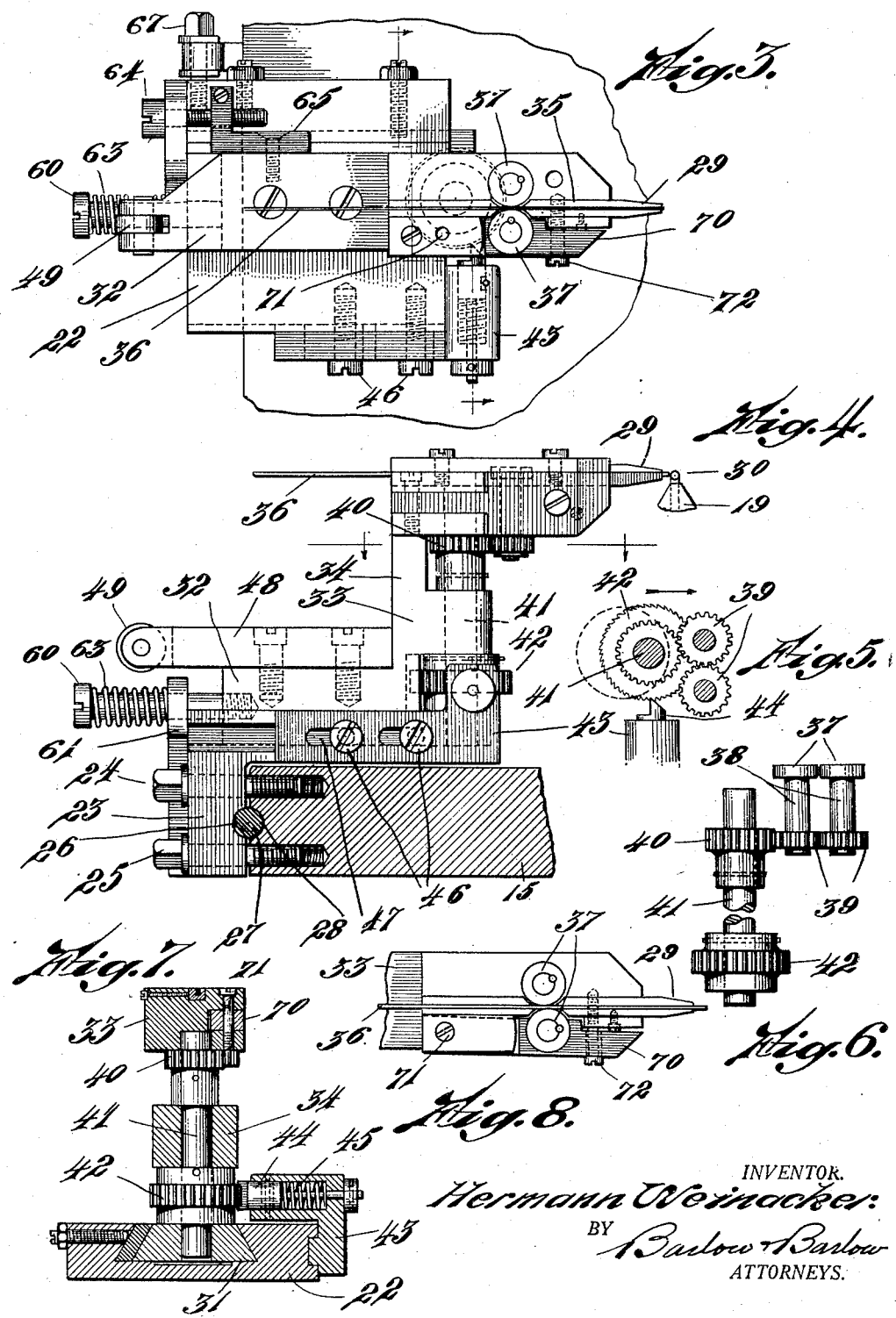

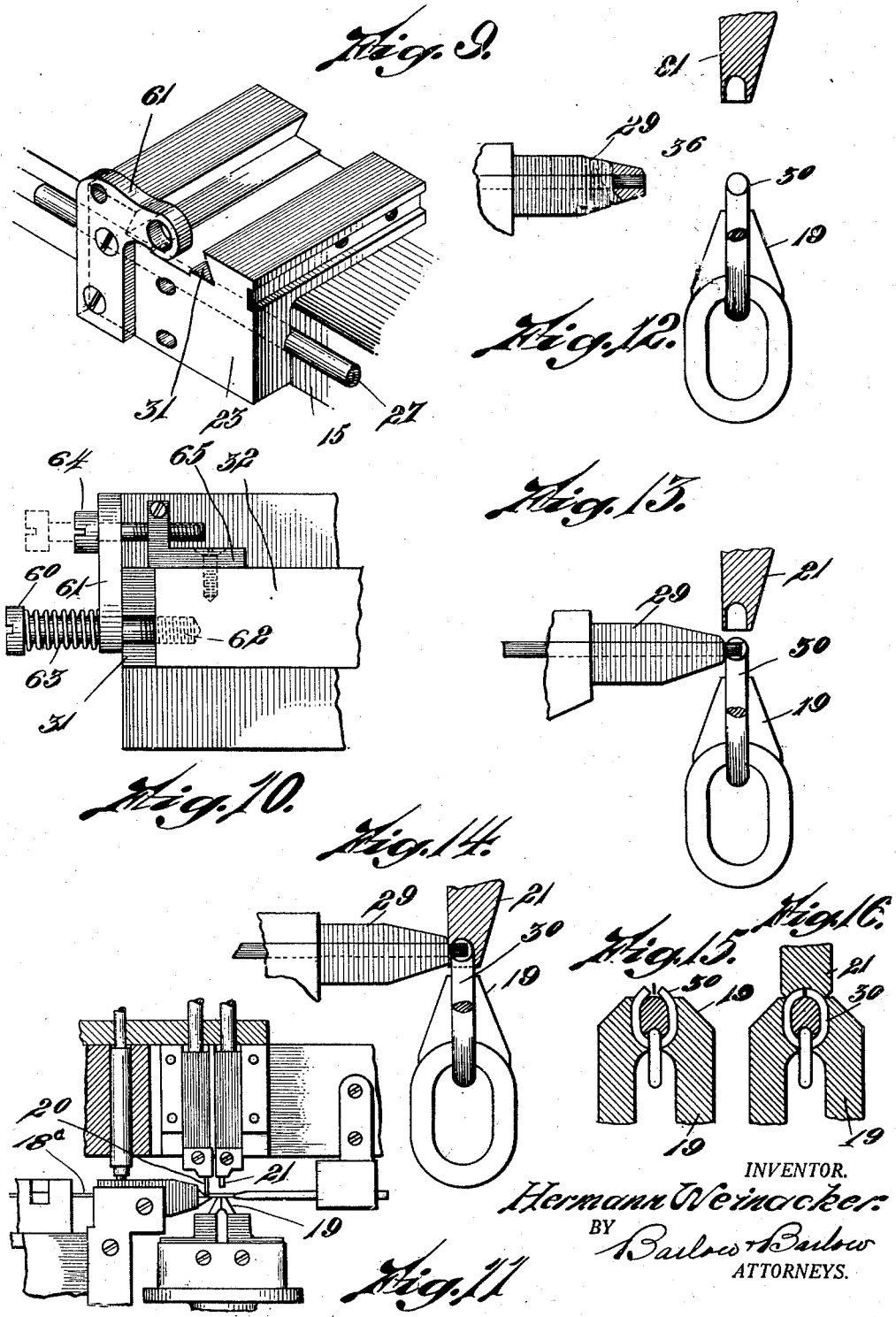

Patented Mar. 11, 1930

1,750,142

UNITED STATES PATENT OFFICE

HERMANN WEINACKER, OF MAPLEWOOD, NEW JERSEY, ASSIGNOR TO UNIVERSAL CHAIN CO. INC., OF MAPLEWOOD, NEW JERSEY, A CORPORATION OF RHODE ISLAND

LINK-WELDING MACHINE

Application filed August 6, 1927. Serial No. 211,179.

This invention relates to improvements in chain making and link-forming machines; and has for its object to provide in such a machine means for forming a link first into substantially U-shape and to provide means for feeding a strip of solder wire between the open ends of the loop and then closing these loop ends onto the solder to insure sufficient solder being at the joint so that when fused the abutting ends at the joint will be securely soldered together.

A further object of the invention is the provision of a carriage over which the solder wire is fed having means mounted thereon for advancing the wire on the carriage and relative to the movement of the carriage as the latter is moved forward.

A further object of the invention is the provision of a set of positively driving feed rolls for advancing the solder wire step by step to the links as formed.

The invention further consists in the provision of means whereby said feed rolls may be adjusted to exert sufficient pressure on the solder wire to reduce it to the desired thickness while being fed to the links.

A further object of the invention is the provision of means for regulating the feeding action of the solder feeding mechanism.

The invention further consists in the provision of means for adjusting the solder feeding mechanism both vertically and laterally relative to the link so as to insure an accurate insertion of the solder strip between the open ends of the chain link being formed.

With these and other objects in view, the invention consists of certain novel features of construction, as will be more fully described, and particularly pointed out in the appended claims.

In the accompanying drawings:

Figure 3 is a top view of a solder wire feeding mechanism as mounted on the bed of the chain machine.

Figure 4 is the same mechanism as illustrated in Figure 3 showing the arrangement of parts whereby the height of the delivery end of the solder feeding mechanism may be adjusted relative to the open ends of the link positioned to receive the solder.

Figure 5 is a top view partly in section illustrating an arrangement of the pawl and ratchet mechanisms and the gears through which the feed rolls are driven.

Figure 6 is an elevation showing the arrangement of the ratchet gear, the roll driving gears and the feed rolls.

Figure 7 is an elevation showing the pawl engaging the ratchet gear and adjustably mounted on the carrier guide plate.

Figure 8 is a top view showing the feed rolls as mounted in the carriage and in engagement with the solder strip.

Figure 9 is a perspective view of the carrier guide plate having a dovetail groove to receive the carrier and showing this plate as mounted to be rocked on the bearing pin.

Figure 10 is a plan view of the carrier guide plate and endways adjusting screw for the carriage.

Figure 11 is a side elevation partly in section showing a portion of the wire feeding and link forming mechanism of the chain machine to which the soldering feeding mechanism is attached.

Figure 12 is a greatly enlarged view showing the delivery end of the solder wire feed guide and a partially formed link also the link closing member shaped to also sever the solder wire.

Figure 13 shows the solder wire feed guide as having advanced to deliver the solder strip between the open ends of the link.

Figure 14 shows the link closing member as having descended and severed the solder wire as it is being gripped by the ends of the link which are now closed upon it.

Figure 15 shows a link in U-shape and as partially closed in its jaws ready to receive the solder strip between its open ends.

Figure 16 shows the link as having been closed upon the solder strip.

Figure 1:
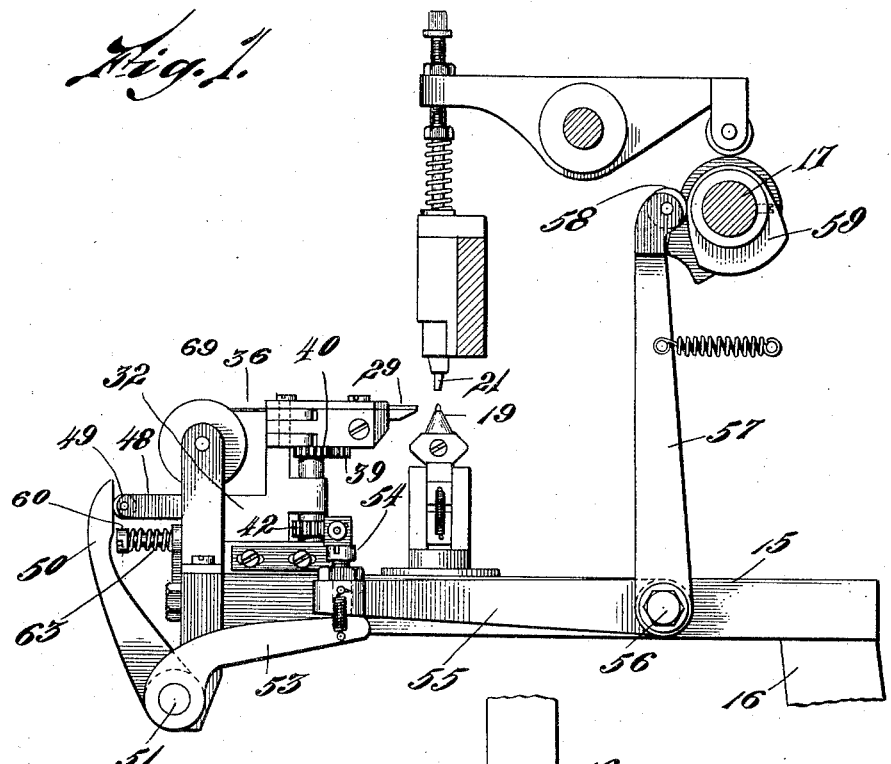
Figure 1 is a side elevation showing a portion of the link forming means and a solder wire feeding mechanism and the arrangement of mechanism whereby these two devices are operated in time with each other.

The usual method of operating chain-making and link-forming machines was to employ a so-called solder core wire in which the links were formed and after the forming operation the chain was subjected to heat of a temperature sufficient to fuse the solder core causing it to expand and ooze from the ends of the link and so unite these ends together at their joints. A solder core wire of this construction is unreliable in that the solder is not uniform in the core and often blank or unfilled spaces are left which when coming at the joint naturally leave the joints unsoldered, but by the use of my improved mechanism for feeding a strip of solder between the ends of the link each and every joint is positively supplied with solder thus insuring a chain in which the joint of every link is properly soldered which is not the case where solder core wire is used. Also it is found of advantage to adjust the delivery end of the solder feeding strip both vertically and longitudinally relative to the link between the open ends of which the solder is to be deposited so as to insure the delivery of the solder at exactly the right place in the link. Also it is found of advantage to provide means in the solder strip feeding means for reducing the size or thickness of the strip as it is being fed to the link; and the following is a detailed description of the present embodiment of my invention and showing one means by which these advantageous results may be accomplished.

With reference to the drawings 15 designates the bed of the usual chain making and link-forming machine which is supported on legs 16 and on this bed is mounted a support (not shown) for the cam shaft 17 which is driven from the usual pulleys (not shown) and is provided with the hand operating wheel 18. In this machine the link wire 18ª is fed by the usual mechanism to the link forming jaws 19, see Figure 11 where it is severed by the cutter 20 and shaped by the member 21 first into U-form and then finally closed in the usual way by an operation of the various cams on the cam shaft 17. The link is first positioned between the jaws 19 and partially closed as best illustrated in Figure 15 when the solder is fed between these open ends and the link is subsequently closed upon the solder into the position illustrated in Figure 16.

In order to feed the solder strip to this link when in its open form, as illustrated in Figure 15, I have provided a carrier guide plate 22 which is mounted on the front edge of the machine table 15. This guide plate has a downwardly-extending front flange 23 thru which it is secured in position to the machine table by means of adjusting screws 24 and 25. The inner face of this downwardly-projecting portion of the plate is grooved as at 26 to fit over the bearing pin 27 which is set in the groove 28 in the forward edge of the machine table 15 whereby this angle portion 23 of the plate is spaced from the edge of the table permitting the plate to rock on this pin and so vertically adjust the delivery end 29 of the solder guide relative to the position of the link 30 held in the jaws 19.

The top of this guide plate has a dovetailed shaped groove as at 31 into which the base 32 of the carriage 33 is set to slide endways. This carriage has a standard 34 at the upper end of which is mounted the guide 35 for the solder wire 36 which is fed from the reel 69. In this wire guide is set a pair of oppositely disposed wire feeding rolls 37 on their respective short shafts 38. On the lower ends of these shafts are mounted a pair of intermeshing gears 39, one of which gears meshes with the larger gear 40 on the vertical shaft 41 in the standard portion 34 of the carriage. On the lower end of this shaft 41 is mounted a ratchet tooth gear 42.

On the side of the carrier plate 22 I mount a pawl supporting plate 43 in which the pawl 44 is carried and pressed forward into position to engage with its ratchet wheel 42 by a spring 45. This pawl may be adjusted longitudinally on its plate 22 relative to its co-operating ratchet gear by means of the screws 46 in their slotted openings 47, whereby the pawl may be caused to engage the ratchet gear either earlier or later in the advance or feeding stroke of the solder feeding carriage and so feed more or less of the solder at each feeding stroke as desired, the feed being positive through the ratchet mechanism and the gears which act directly upon the feed wheels 37. In order to impart a reciprocating motion to the carriage 32, I have mounted a bar or plate 48 on the carriage 32 in the end of which is a roller 49 that is engaged by the lever arm 50, which arm is mounted on a short shaft 51 in the bracket 52, the opposite end of the shaft being provided with a lever arm 53, the outer end of which extends rearwardly to engage through the adjusting screw 54 with the lever arm 55, the two being connected together by a spring. The arm 55 is pivoted at 56 and is provided with an upright arm 57 having a roll 58 in engagement with an operating cam 59 on the cam shaft 17, by which construction the feeding action of the solder strip is caused to work in perfect time with the link-forming mechanism as both are operated from the same cam shaft 17, see Figure 1.

In order to determine the starting position of the carriage 32, I have provided an adjustable screw 60 which extends through the opening in the bracket plate 61 and is threaded at its inner end into the end of carriage 32 as at 62 and is pressed to its retracted position against the end of its operating arm 50, see Figure 1, by means of the spring 63, and a stop screw 64 also extends through the bracket 61 and is threaded into the bracket member 65 attached to one side of the carriage 32 to prevent excessive forward motion of the carriage, the position of the carriage in Figure 10 being illustrated as in its extreme forward position the dotted lines of the screw 64 showing the position of that screw when the carriage is in its retracted position.

Figure 2:
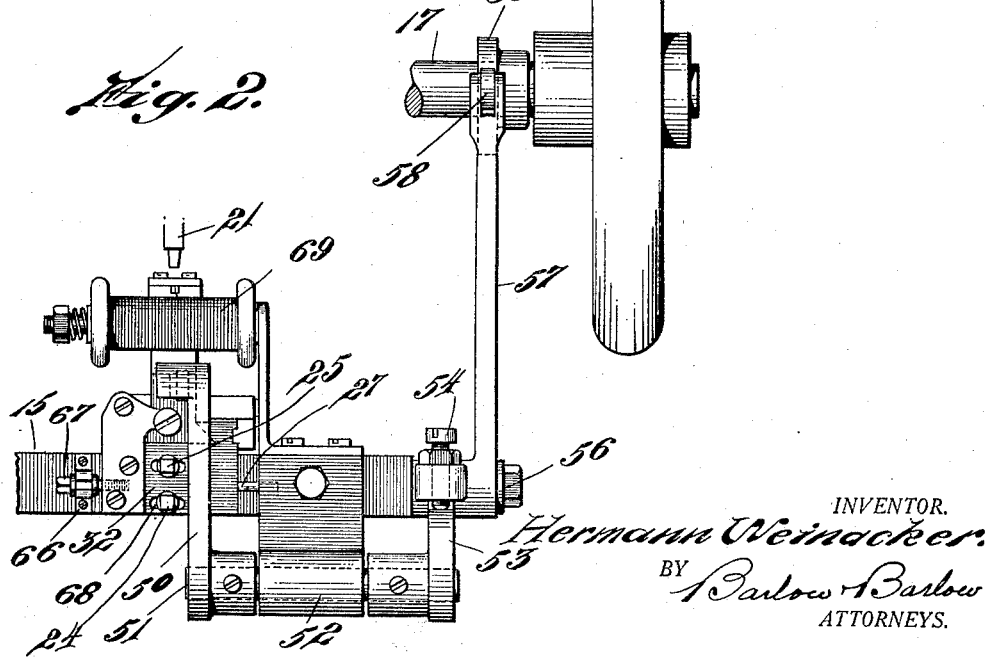
Figure 2 is a front view showing the same mechanism as illustrated in Figure 1.

It is found in practice of advantage to be able to adjust the whole carrier guide plate laterally on the machine table so as to bring the solder at exactly the right point between the open ends of the link. To accomplish this in a simple and effective way, I have secured the bracket 66 to the table 15, as best illustrated in Figure 2, and in this bracket I mount an adjustable screw 67 threaded into the carrier guide plate 32 whereby when it is desired to adjust this plate laterally, the screws 24 and 25 are slackened and the slots 68 in this downward extended end of this guide plate permit a longitudinal sliding motion of the whole plate after which the screws 24 and 25 are again set up.

In order to control the space between the feed rolls 37 and so control the width of the solder wire as fed to the links, I have mounted one of the feed rolls 37 in the movable block 70 which is pivoted at one end as at 71 and is provided with an adjusting screw 72 whereby when set up this screw will force one of the rolls 37 closer to the opposite roll 37 and in this way will roll down or reduce the width of the solder wire 36 to the desired dimensions to be used for the particular size of link to which it is being applied. An adjustable stop screw is employed against which this swing block 70 rests to limit its inward swinging motion.

By my improved contruction of solder wire feeding mechanism, it will be seen that the same is operated in perfect time with the link-forming mechanism, also that it is provided with both a vertical and lateral adjustment to insure the solder being fed accurately into the space between the open ends of the link also that the solder wire is positively fed and that the amount of the feeding may be varied and nicely controlled, also that by a simple adjustment the size of the solder wire may be reduced to the required dimension as it is being fed to the link.

My improved solder feeding mechanism is extremely simple and practical in its construction and is effective in its operation and by its use the links of a chain may be much more securely soldered than when the usual solder core wire is employed in the formation of the links.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a chain or link-forming machine, means for feeding, severing, and bending a length of link wire into open link form, a solder strip carrier, means for imparting a bodily longitudinal movement to the carrier, means for simultaneously advancing the solder strip in the carrier relative to and during the forward movement of the carrier to its operating position, and means for subsequently closing the loop upon the solder.

2. In a chain or link forming machine, means for feeeding, severing and bending a length of link wire into open link form, a solder strip carrier, means for imparting a bodily longitudinal movement to the carrier, means for simultaneously accelerating the movement of the solder strip in the carrier relative to and during the forward movement of the carrier whereby the said solder strip will be positioned between the open ends of the link while the said carrier is in motion, and means for closing the link and simultaneously severing the solder strip.

3. In a chain or link forming machine, means for feeding, severing and bending a length of link wire into open link form, a solder strip carrier, means for imparting a bodily longitudinal movement to the carrier, means for simultaneously advancing the solder strip in the carrier relative to and during the forward movement of the carrier to its operating position, means for subsequently closing the loop upon the solder, and pivotal means for regulating the elevation of the feeding end relative to the open solder receiving ends of the link.

4. In a chain or link forming machine, means for forming a length of wire into a loop, a solder strip carrier, means for imparting a bodily longitudinal movement to the carrier, a pair of feed rolls mounted in said carrier for advancing the solder strip during the forward movement of the carrier to its operating position, means for adjusting said rolls to act upon and reduce said strip to the size desired, and means for subsequently closing said link upon the solder.

5. In a chain or link forming machine, mean for forming a length of wire into a loop, a bodily longitudinally movable carrier, a cam actuated arm for moving the carrier towards the wire loop, means for simultaneously advancing the solder strip in the carrier relative to and during the forward movement of the carrier to its operating position, an adjustable stop to limit the forward movement of said carrier, and means for closing the link and simultaneously severing the solder strip.

6. In a chain or link forming machine, means for forming a length of wire into a loop, a solder strip carrier, means for imparting a bodily longitudinal movement to the carrier, means for simultaneously advancing the solder strip in the carrier relative to and during the forward movement of the carrier to its operating position including feed rolls on said carrier and pawl and ratchet mechanism for positively actuating said rolls by the movement of said carrier, means for adjusting the pawl and its ratchet wheel relative to each other to control the extent of the feeding action of said rolls, and means for closing the loop and simultaneously severing the solder strip.

7. In a chain or link forming machine, means for feeding, severing and bending a length of wire into open loop form, a solder strip carrier, means for imparting a bodily longitudinal movement to the carrier, means for simultaneously advancing the solder strip in the carrier relative to and during the forward movement of the carrier to its operating position, said solder advancing means including gear driven solder gripping rolls mounted on said carrier and positively actuated by the movement thereof, and means for closing the link on to the solder.

8. In a chain or link forming machine, having mechanism for feeding, severing, and bending a length of wire into open loop form, a movable solder strip carrier, means for moving said carrier to present the solder strip to the open loop of the wire, mechanism for closing the link on to the solder, means for longitudinally and laterally adjusting said carrier and means for adjusting the height of said carrier irrespective of the longitudinal or lateral adjustment of said carrier.

9. In a chain or link forming machine, a base, a solder strip carrier movably mounted on said base, means operative to advance the solder strip in the carrier, and means positively actuated by the relative movement of said carrier and base for operating the advancing means.

10. A method of soldering links of a chain or the like which consists in feeding a strip of solder to the point of juncture of the ends of the link and reducing the thickness of the solder preliminary to its reaching the juncture of said link ends.

11. A method of forming and soldering links of a chain which consists in forming a length of wire into U shape, feeding a strip of solder to the point of meeting of the ends of the U link, reducing the size of the solder preliminary to its reaching the points of meeting of the ends of the link, then closing the link onto the reduced size of solder.

In testimony whereof I affix my signature.

HERMANN WEINACKER.